(12) United States Patent
Wang et al.

(10) Patent No.: US 10,592,530 B2
(45) Date of Patent: Mar. 17, 2020

(54) SYSTEM AND METHOD FOR MANAGING TRANSACTIONS FOR MULTIPLE DATA STORE NODES WITHOUT A CENTRAL LOG

(71) Applicant: VMware, Inc., Palo Alto, CA (US)

(72) Inventors: Wenguang Wang, Santa Clara, CA (US); Abhishek Gupta, Sunnyvale, CA (US); Kapil Chowksey, Cupertino, CA (US); Richard P. Spillane, Mountain View, CA (US); Rob Johnson, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 152 days.

(21) Appl. No.: 15/878,341

(22) Filed: Jan. 23, 2018

(65) Prior Publication Data

US 2019/0228096 A1    Jul. 25, 2019

(51) Int. Cl.
*G06F 11/00*     (2006.01)
*G06F 16/27*     (2019.01)
*G06F 11/14*     (2006.01)
*G06F 16/23*     (2019.01)

(52) U.S. Cl.
CPC ........ *G06F 16/273* (2019.01); *G06F 11/1469* (2013.01); *G06F 11/1471* (2013.01); *G06F 16/2315* (2019.01); *G06F 2201/805* (2013.01); *G06F 2201/82* (2013.01)

(58) Field of Classification Search
CPC .............. G06F 16/273; G06F 16/2315; G06F 11/1469; G06F 11/1471; G06F 2201/805; G06F 2201/82

USPC .......................................................... 714/19
See application file for complete search history.

(56) References Cited

U.S. PATENT DOCUMENTS

| | | | | |
|---|---|---|---|---|
| 5,781,910 | A * | 7/1998 | Gostanian | G06F 11/202 |
| | | | | 707/610 |
| 8,667,033 | B1 * | 3/2014 | McCline | G06F 16/22 |
| | | | | 707/826 |
| 2007/0088977 | A1 * | 4/2007 | Eguchi | G06F 11/142 |
| | | | | 714/6.12 |
| 2013/0054888 | A1 * | 2/2013 | Bhat | G06F 3/0604 |
| | | | | 711/114 |
| 2015/0309884 | A1 * | 10/2015 | Campbell | G06F 11/1469 |
| | | | | 714/19 |
| 2016/0217042 | A1 * | 7/2016 | Wang | G06F 11/1464 |
| 2016/0283331 | A1 * | 9/2016 | Barber | G06F 16/254 |

OTHER PUBLICATIONS

Wikipedia "RAID" page, retrieved from https://en.wikipedia.org/wiki/RAID (Year: 2019).*

* cited by examiner

*Primary Examiner* — Yair Leibovich
(74) *Attorney, Agent, or Firm* — Loza & Loza, LLP

(57) ABSTRACT

Data storage system and method for managing transaction requests in the data storage system utilizes prepare requests for a transaction request for multiple data storage operations. The prepare requests are sent to selected destination storage nodes of the data storage system to handle the multiple data storage operations. Each prepare request includes at least one of the multiple data storage operations to be handled by a particular destination data store node and a list of the destination storage nodes involved in the transaction request.

18 Claims, 12 Drawing Sheets

SYSTEM AND METHOD FOR MANAGING TRANSACTIONS FOR MULTIPLE DATA STORE NODES WITHOUT A CENTRAL LOG

BACKGROUND

A high-performance transaction system often consists of multiple data stores where the data stores operate separately but concurrently. In order to make these data stores more fault tolerant, each data store usually has its own log to perform transactional update. To perform global atomic transaction across all data stores, a centralized log with 2-phase commit is often used to unify each transaction domain in the data stores into a global transaction domain so that transactions spanning multiple data stores can be made atomic. This centralized log can easily become performance bottleneck when the number of data stores is high.

BRIEF DESCRIPTION OF THE DRAWINGS

Throughout the description, similar reference numbers may be used to identify similar elements.

DETAILED DESCRIPTION

Figure 1:
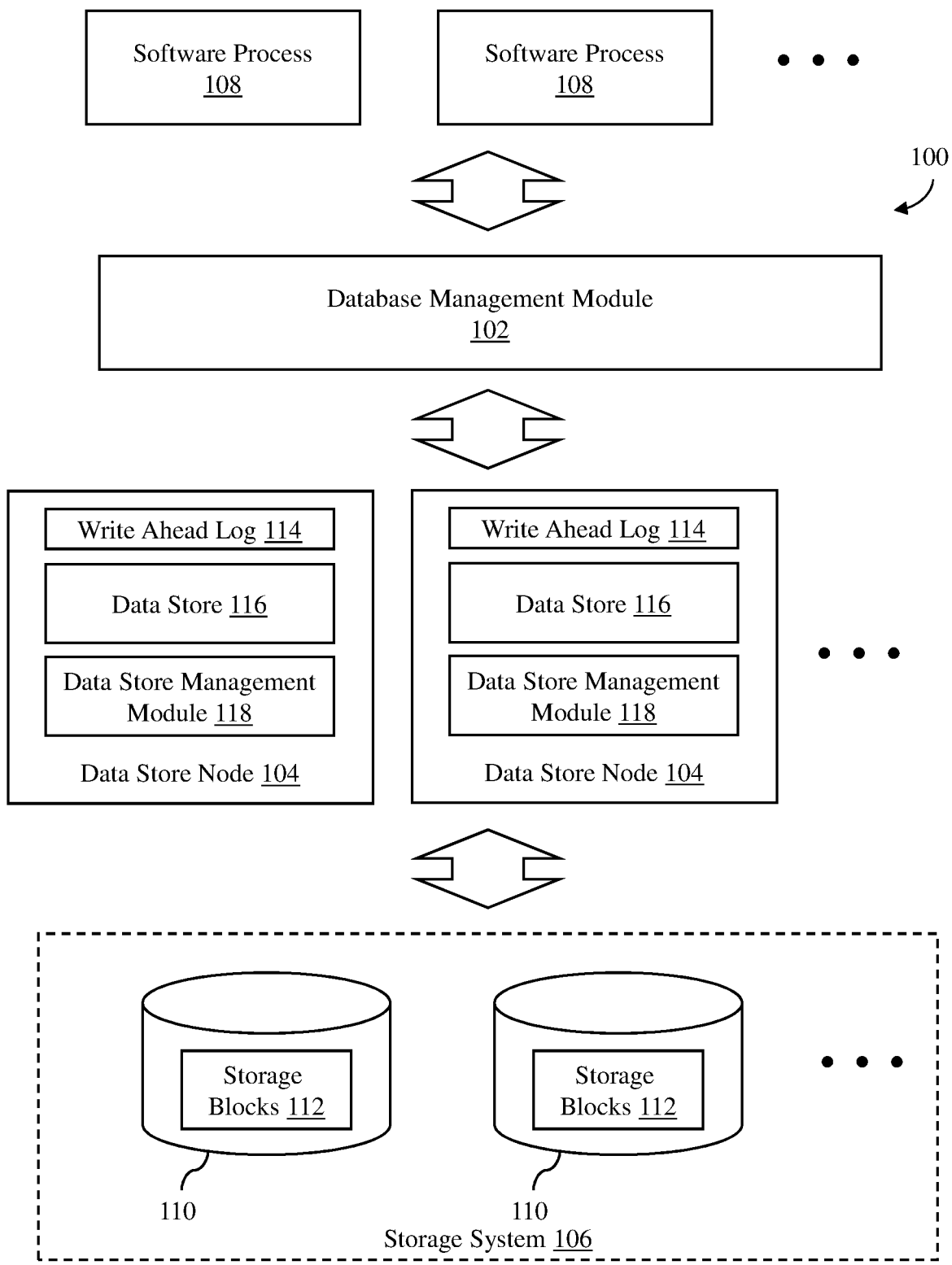
FIG. 1 is a block diagram of a distributed data storage system in accordance with an embodiment of the invention.

FIG. 1 depicts a distributed data storage system 100 in accordance with an embodiment of the invention. As shown in FIG. 1, the distributed data storage system 100 includes a central database management module 102, a number of data store nodes 104 and a storage system 106. The distributed data storage system 100 allows software processes 108 to perform data storage operations, such as writing, reading or deleting data stored in the storage system 106. The distributed data storage system 100 operates to process transactional requests from software processes 108 to store and manage data for the software processes. The data stored in the distributed data storage system 100 can be any type of data, including metadata of stored data. As described in detail below, the distributed data storage system 100 is designed to execute these storage operations without the need for a central log, which can cause performance degradation due to processing bottlenecks.

The software processes 108 can be any software program, applications or software routines that can run on one or more computer systems, which can be physical computers, virtual computers, such as VMware virtual machines, or a distributed computer system. The software processes 108 may initiate various data storage operations, such as read, write, delete and rename operations, which are handled by the data store nodes 104 of the distributed data storage system 100. The actual data, including associated metadata, is stored in the storage system 106.

The storage system 106 of the distributed data storage system 100 includes one or more computer data storage devices 110, which are used by the distributed data storage system 100 to store data, which may include metadata. The data storage devices 110 can be any type of non-volatile storage devices that are commonly used for data storage. As an example, the data storage devices 110 may be, but not limited to, persistent memory (PM), non-volatile memory express (NVMe), solid-state devices (SSDs), hard disks or a combination of the four. The storage space provided by the data storage devices 110 may be divided into storage blocks 112, which may be disk blocks, disk sectors or other storage device sectors.

Some of the data storage devices 110 of the storage system 106 may be local data storages of computer systems supporting one or more data store nodes, such as hard drive disks. Some of the data storage devices 110 of the storage system 106 may be part of remote storage systems that can be accessed via a network, such as a network-attached storage (NAS). Some of the data storage devices 110 of the storage system 106 may be part of a distributed storage system, such as a storage area network (SAN) or a virtual SAN. The storage system 106 may include any combination of these different types of data storages. In some embodiments, the storage system 106 may include other components commonly found in data storages, such as network adapters, storage drivers and/or storage management servers.

The data store nodes 104 operates to maintain data stores to store data, which may include metadata, for the software processes 108. Each data store node operates as an independent data storage system to maintain data in its data store. As explained in detail below, the data store nodes interact with the central management module 102 to perform various operations to add, update and maintain data stored in their respective data stores.

As illustrated in FIG. 1, each data store node 104 includes a write ahead log 114, a data store 116 and a data store management module 118 in accordance with an embodiment of the invention. The write ahead log 114 is a data structure that is used by the data store management module 118 to maintain a log of various records related to transaction requests from the software processes. The write ahead log may be used to record prepare requests from the central database management module 102 as prepare log entries. A prepare request is a request from the central database management module to handle certain data storage operations of a particular transaction request. Each prepare request may include at least a transaction identification (ID) for a particular transaction request, a list of one or more data storage operations to be handled by the receiving data store node, and a list of data store nodes involved in the transaction request. The write ahead log may also be used to record operations of transaction requests that have been committed, which may be indicated by transaction IDs that have been committed and recorded as commit log entries. Each commit log entry may include one or more transaction IDs of transaction requests that have been committed. The write ahead log may also be used to record checkpoints, which are initiated by the central database management module and recorded as checkpoint log entries. Each checkpoint includes at least a transaction ID, which indicates that all operations of transaction requests up to the transaction request corresponding to the transaction ID have been handled or completed. The entries in the write ahead log are persistently written to the storage system so that entries related to previous transaction requests are not lost when a failure, such as a system crash, occurs.

The data store 116 of the data store node 104 is used to store data for the software processes 108. In an embodiment, the data store 116 may be a key-value (KV) store or database, which is a non-relational database. In this embodiment, the data store stores key-value pairs, where unique keys are used to find associated values. In some implementations, the data store may use an on-disk storage data structure that supports efficient create, read (lookup), update, delete, and range scans operations, such as a B-tree, to store the key-value pairs. However, in other embodiments, the data store can be any type of a data store or a database.

The data store management module 118 of the data store node 104 operates to manage the write ahead log 114 and the data store 116. The data store management module operates to insert and delete entries into the write ahead log, which include data storage operations that are to be executed by the data store node. The data store management module interacts with the central database management module to receive requests for data storage operations, batch commits, checkpointing and recovery, which are then executed at the data store node by the data store management module, as explained in more detail below.

In an embodiment, the data store management module 118 may be implemented as software running on one or more computer systems, which can be physical computers, virtual computers, such as VMware virtual machines, or a distributed computer system. However, in other embodiments, the data store management module may be implemented in any combination of hardware and software.

The central database management module 102 operates to manage data and/or metadata stored in the storage system 106 via the data store nodes 104. As used herein, data stored in the storage system 106 may include any type of computer files, and metadata stored in the storage system may include information that describes the stored data with respect to its characteristics and physical storage locations. Thus, the metadata of stored data or "storage metadata" may include file names, file paths, modification dates and permissions.

If the central database management module 102 is used for a file system, the central database management module may present data stored in the storage system 106 as one or more file system structures, which include hierarchies of file system objects, such as file system volumes, file directories/folders, and files, for shared use of the storage system. Thus, the central database management module 102 may organize the storage resources of the storage system 106 into the file system structures so that the software processes 108 can access the file system objects for various file system operations, such as creating file system objects, deleting file system objects, writing or storing file system objects, reading or retrieving file system objects and renaming file system objects.

The central database management module 102 operates to handle requests for data storage operations when transaction requests for one or more data storage operations are received from the software processes 108. These data storage operations may include, for example, insert, delete, read and rename operations. The central database management module may then distribute the data storage operations of the transaction requests to different data store nodes to be handled by those data store nodes. The central database management module can select the data store nodes for distributing data storage operations of a transaction request using any predetermined algorithm, for example, using hashing or a small lookup table. For each transaction request being distributed among multiple data store nodes, the central database management module sends prepare requests to all the multiple data store nodes involved in the transaction request. The prepare request sent to each data store node involved in a particular transaction request informs that data store node to handle certain data storage operations of the transaction request. Each prepare request may include at least a transaction ID, a list of one or more data storage operations to be handled by the receiving data store node, and a list of data store nodes involved in the transaction. The transaction ID may be a number that is generated by the central database management module for each received transaction request. In an embodiment, the transaction ID number may be increased by one (1) or any other number for each subsequently received transaction request so that order of transaction requests received at the central database management module can be determined by the transaction IDs. When each of the data store nodes acknowledges the receipt of the prepare request, the central database management module can send an acknowledgement message back to the software process that had sent the transaction request that the transaction request will be handled. In an embodiment, the central database management module may initiate a batch commit for a number of transaction requests after a certain amount of time or after a certain number of transaction requests have been handled.

Periodically, the central database management module 102 executes a checkpoint operation so that the data store nodes can remove log entries related to completed transaction requests from their write ahead logs. The checkpointing operation can be initiated after a certain number of transaction requests have been processed or after a certain amount of time.

In an embodiment, the central database management module 102 may be implemented as software running on one or more computer systems, which can be physical computers, virtual computers, such as VMware virtual machines, or a distributed computer system. However, in other embodiments, the central database management module may be implemented in any combination of hardware and software.

Figure 2:
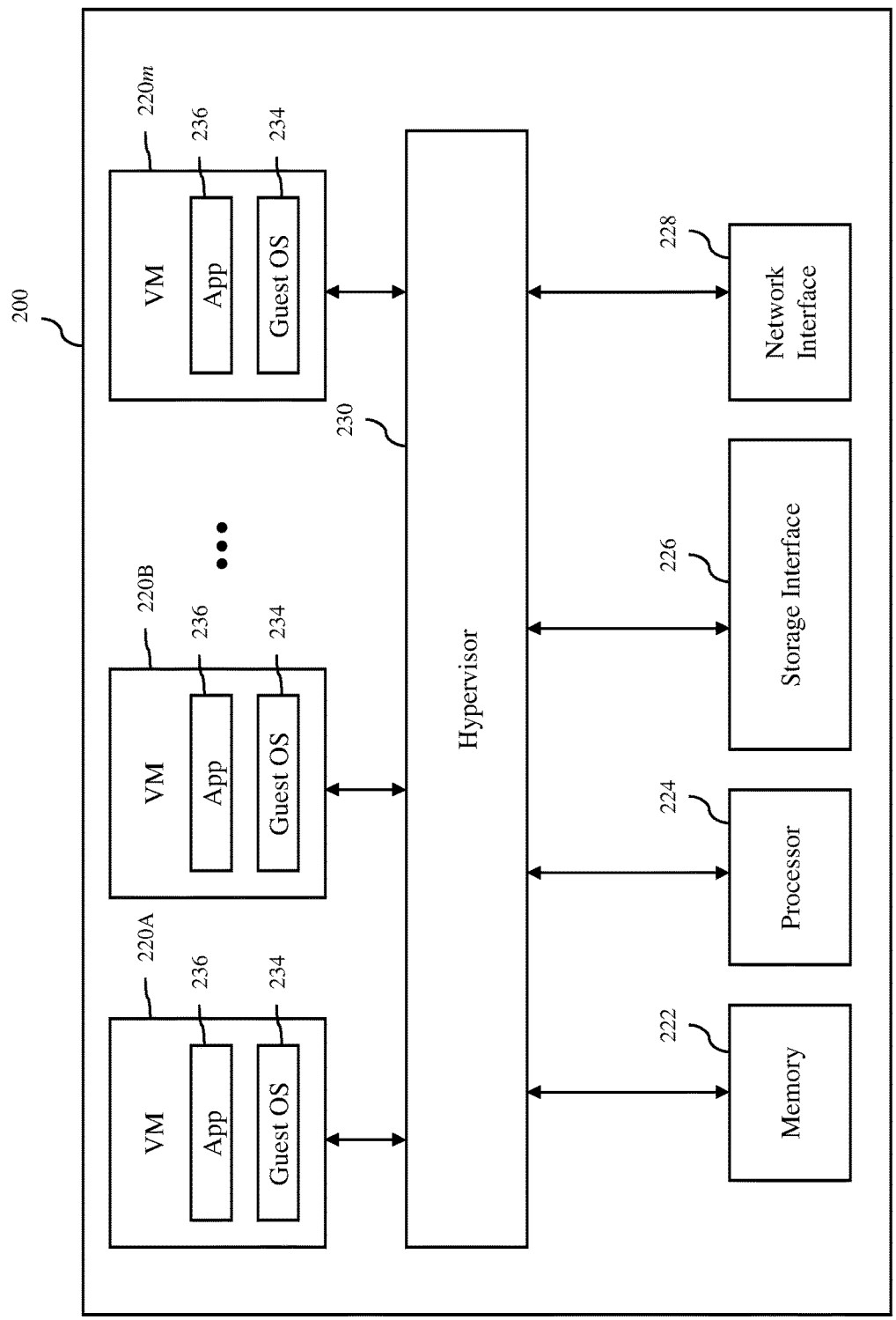
FIG. 2 is a block diagram of a host computer, which can support a central database management module or one or more data store nodes of the distributed data storage system in accordance with an embodiment of the invention.

Turning now to FIG. 2, components of a host computer 200 that can support the central database management module 102 or one or more data store nodes 104 in accordance with an embodiment of the invention are shown. That is, the central database management module or one or more data store nodes may be executed in a computer system similar to the host computer 200. In FIG. 2, the physical connections between the various components of the host computer are not illustrated. In the illustrated embodiment, the host computer is configured to support a number of virtual entities 220A, 220B . . . 220m (m is an integer), which are VMs. The number of VMs supported by the host computer can be anywhere from one to more than one hundred. The exact number of VMs supported by the host computer is only limited by the physical resources of the host computer and the resource requirements of the VMs. The VMs share at least some of the hardware resources of the host computer, which include one or more system memories 222, one or more processors 224, one or more storage interfaces 226, and one or more network interfaces 228. Each system memory 222, which may be random access memory (RAM), is the volatile memory of the host computer. Each processor 224 can be any type of a processor, such as a central processing unit (CPU) commonly found in a server. In some embodiments, each processor may be a multi-core processor, and thus, includes multiple independent processing units or cores. The storage interface 226 is an interface that allows that host computer to communicate with the storage system 106. As an example, the storage interface may be a host bus adapter or a network file system interface. The network interface 228 is an interface that allows the host computer to communicate with other devices connected to the same network. As an example, the network interface may be a network adapter.

In the illustrated embodiment, the VMs 220A, 220B . . . 220m run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 234 and one or more guest applications 236. The guest operating system manages virtual system resources made available to the corresponding VM by the hypervisor, and, among other things, the guest operating system forms a software platform on top of which the guest applications run.

Similar to any other computer system connected to the same network, the VMs 220A, 220B . . . 220m are able to communicate with other computer systems connected to the network using the network interface 228 of the host computer 200. In addition, the VMs are able to access the storage system 106 using the storage interface 226 of the host computer.

Figure 3:
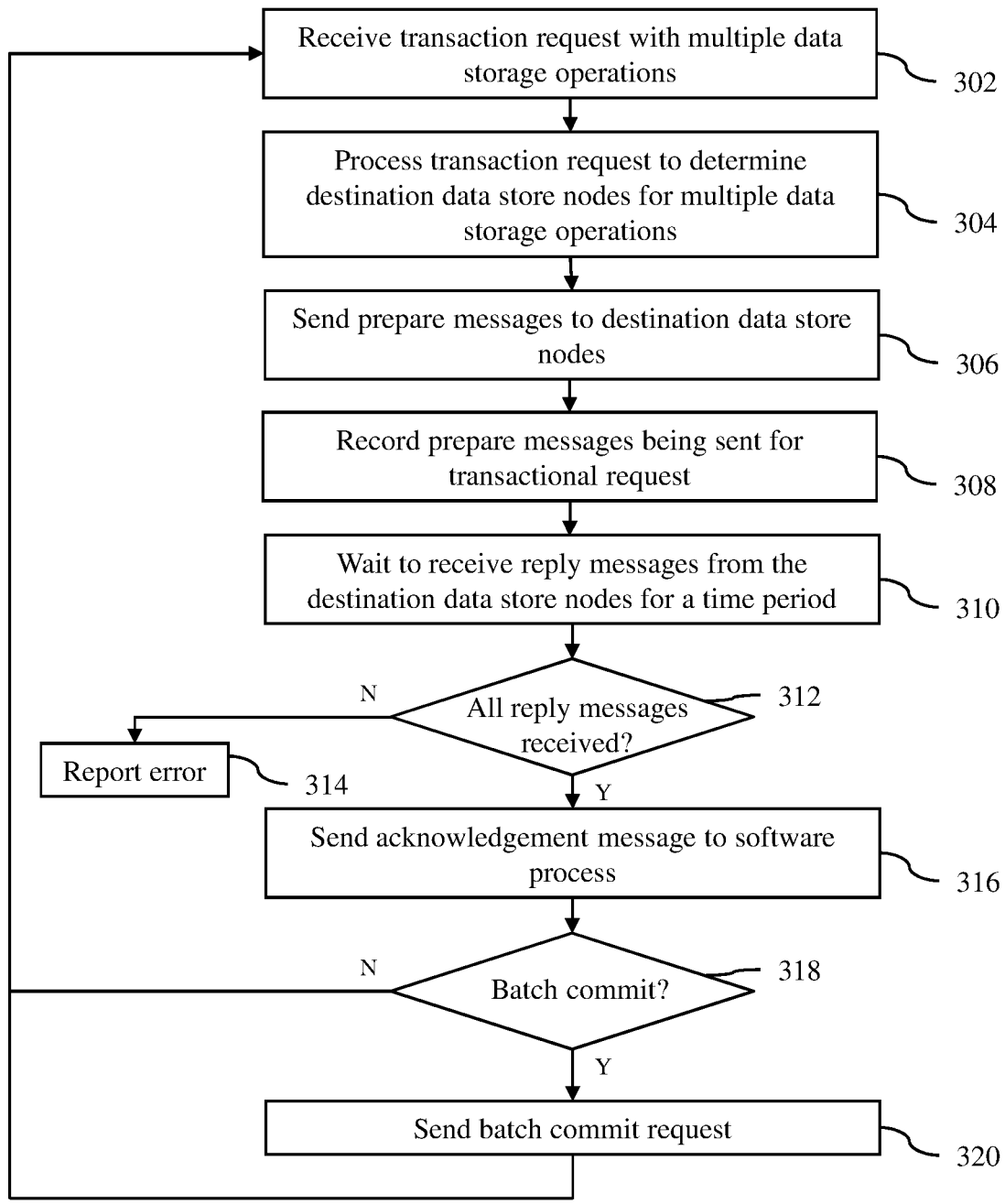
FIG. 3 is a process flow diagram of the transaction processing operation of the distributed data storage system in accordance with an embodiment of the invention.
Figure 4A:
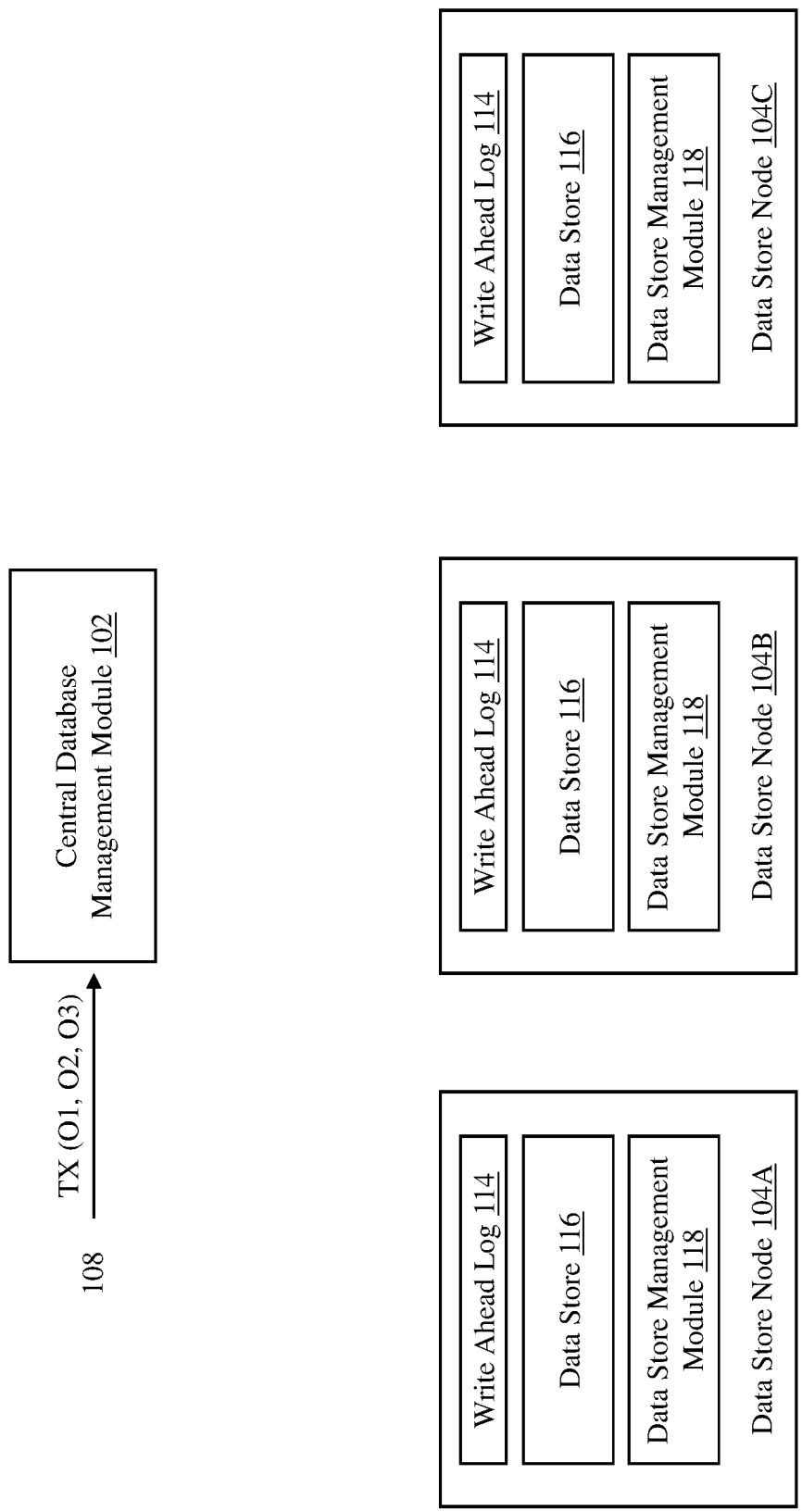
FIGS. 4A-4F illustrate an example of the transaction processing operation in accordance with an embodiment of the invention.

The transaction processing operation of the distributed data storage system 100 in accordance with an embodiment of the invention will now be described with reference to a flow diagram of FIG. 3 using an example illustrated in FIGS. 4A-4F. Turning now to FIG. 3, at block 302, the central database management module 102 receives a transactional request with multiple data storage operations from one of the software processes 108. This step is illustrated in FIG. 4A, which shows a transaction TX with data storage operations O1, O2 and O3 from one of the software processes 108 being received at the central database management module.

Figure 4B:
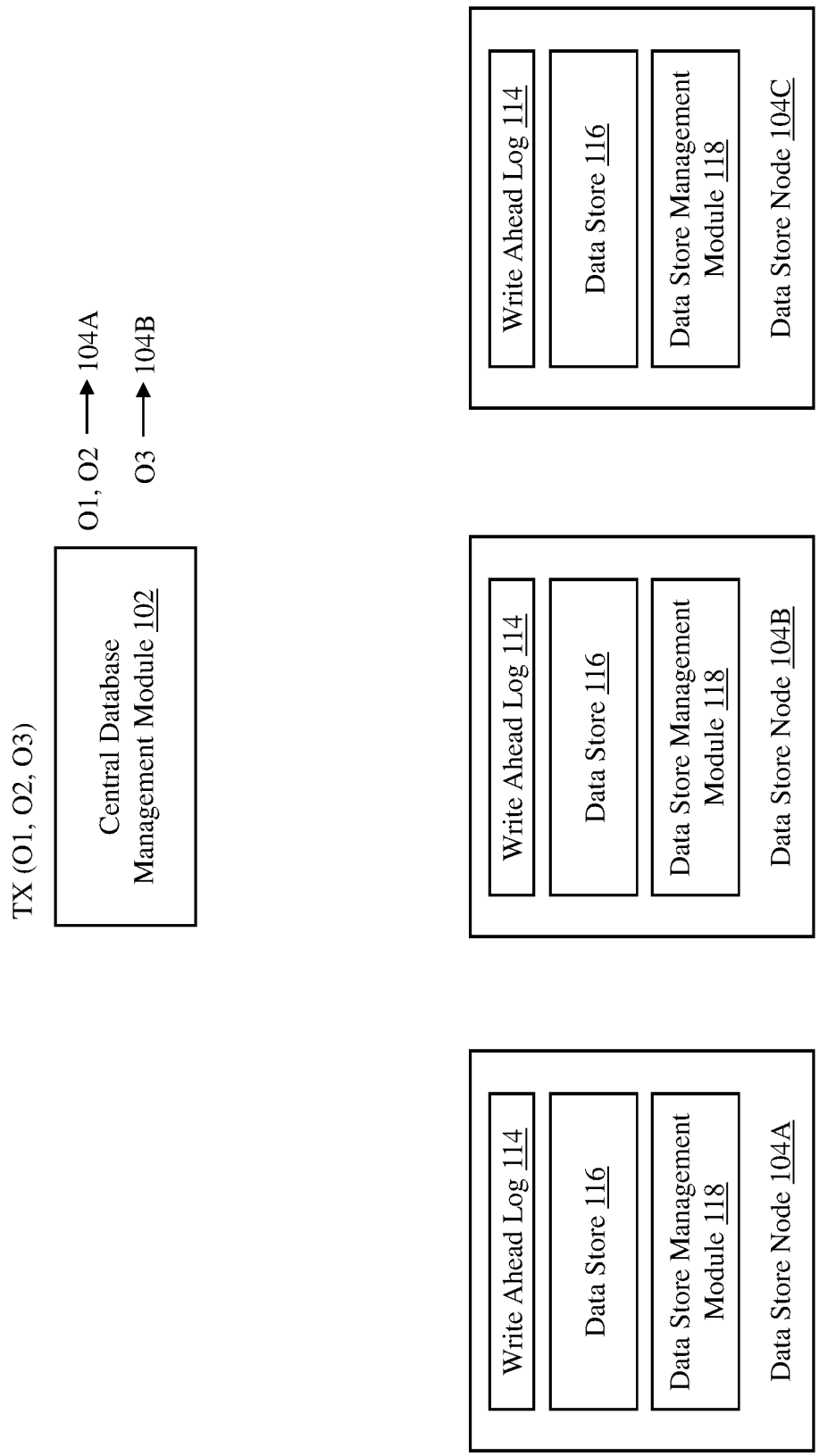

Next, at block 304, the central database management module 102 processes the transaction request to determine destination data store nodes for the multiple data storage operations in the received transaction request. If the multiple data storage operations are new data storage operations, the central database management module selects the destination data store nodes for the underlying data of the multiple data storage operations based on a predetermined transaction distribution algorithm, which may involve hashing or using a small lookup table. Such a transaction distribution algorithm is known and thus, is not described herein in detail. If the multiple data storage operations are updating operations, the central database management module correlates the multiple data storage operations with the previously selected destination data store nodes for the underlying data corresponding to the data storage operations. This step is illustrated in FIG. 4B, which shows the data store node 104A being selected for the data storage operations O1 and O2, and the data store node 104B being selected for the data storage operation O3.

Figure 4C:
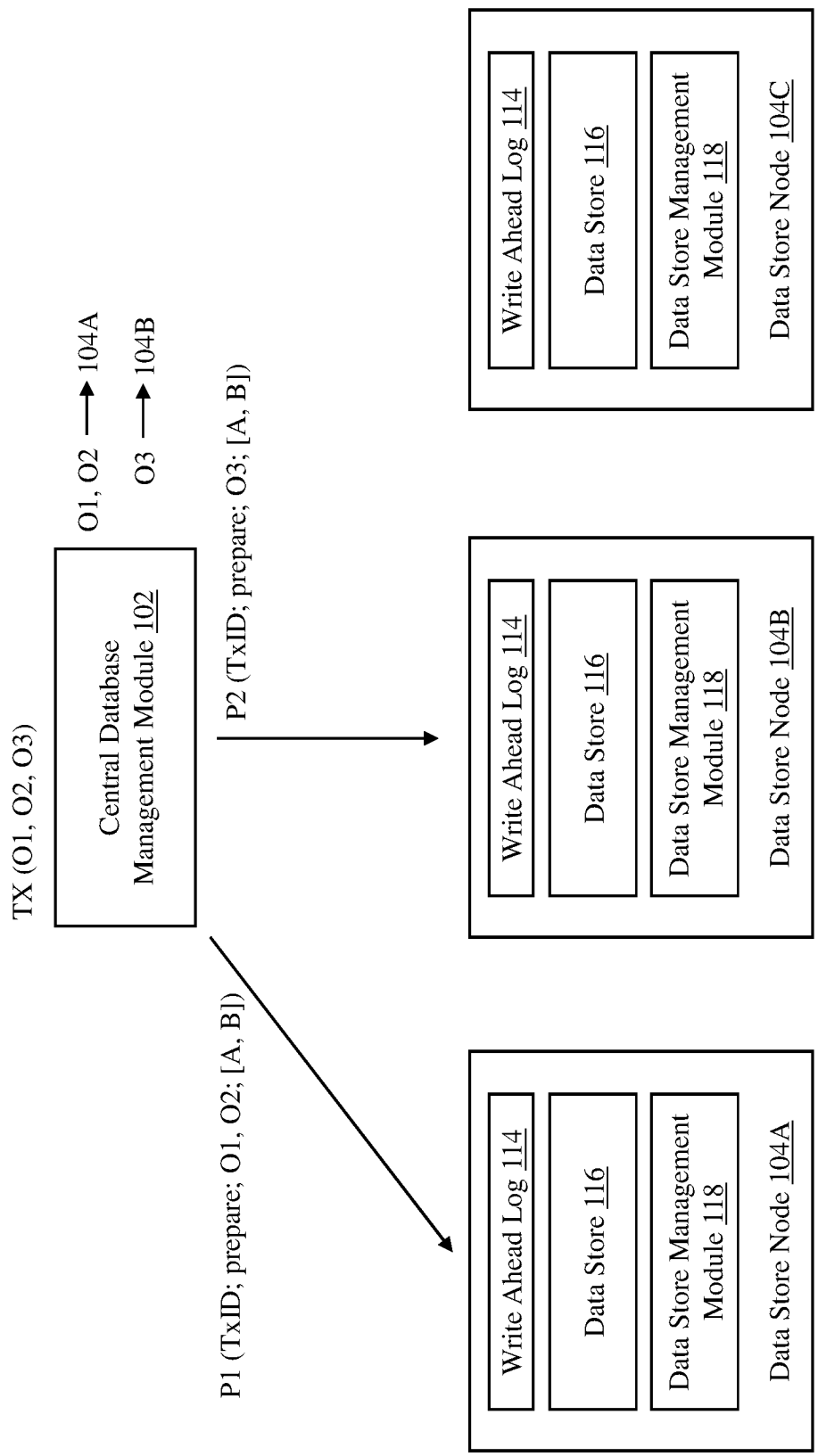

Next, at block 306, the central database management module 102 sends prepare requests for the multiple data storage operations to their determined data store nodes. In an embodiment, each prepare request to a determined data store node includes the transaction id of the transaction request, the message type (i.e., prepare), a list of all the data storage operations to be handled by the determined data store node for this transaction request and a list of all the data store nodes that are involved for this transaction request. This step is illustrated in FIG. 4C, which shows a prepare request P1 for the data storage operations O1 and O2 being sent to the data store node 104A and a prepare request P2 being sent to the data storage operation O3 being sent to the data store node 104B. The prepare request P1 includes the transaction id "TxId", the message type "prepare", the data store operations "O1, O2", and the data store nodes "A, B" ("A" corresponding to the data store node 104A and "B" corresponding to the data store 104B).

Next, at optional block 308, the central database management module 102 records the prepare requests being sent to their determined data store nodes. In an embodiment, the central database management module records the prepare requests in a data structure, which may be stored in any storage accessible by the central database management module.

Figure 4D:
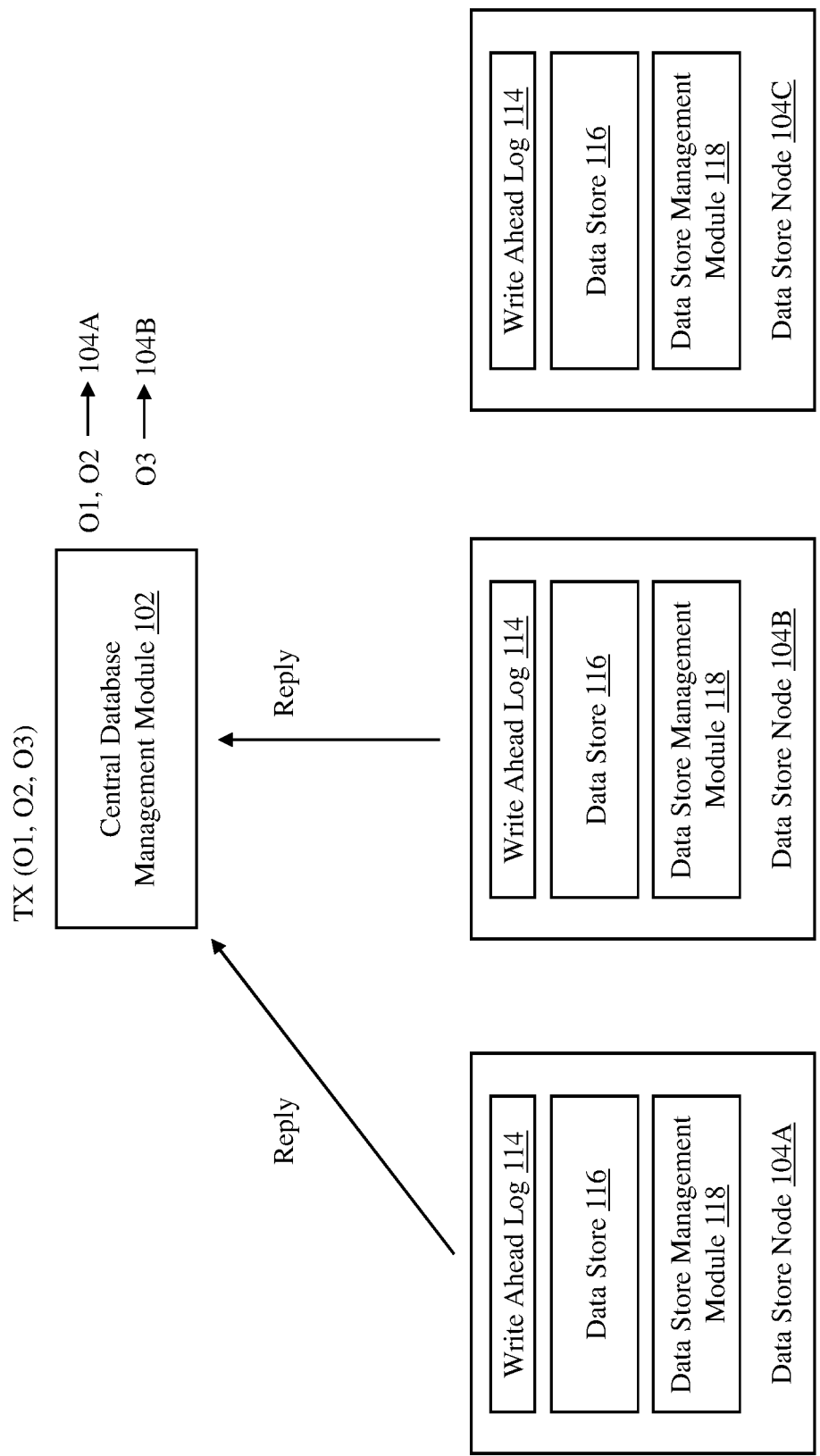

Next, at block 310, the central database management module 102 waits for reply messages from the data store nodes to which the prepare requests were sent. During this waiting period, the central database management module may receive reply messages from any of the data store nodes to which the prepare requests were sent. This step is illustrated in FIG. 4D, which shows reply messages from the data store nodes 104A and 104B being received at the central database management module.

Figure 4E:
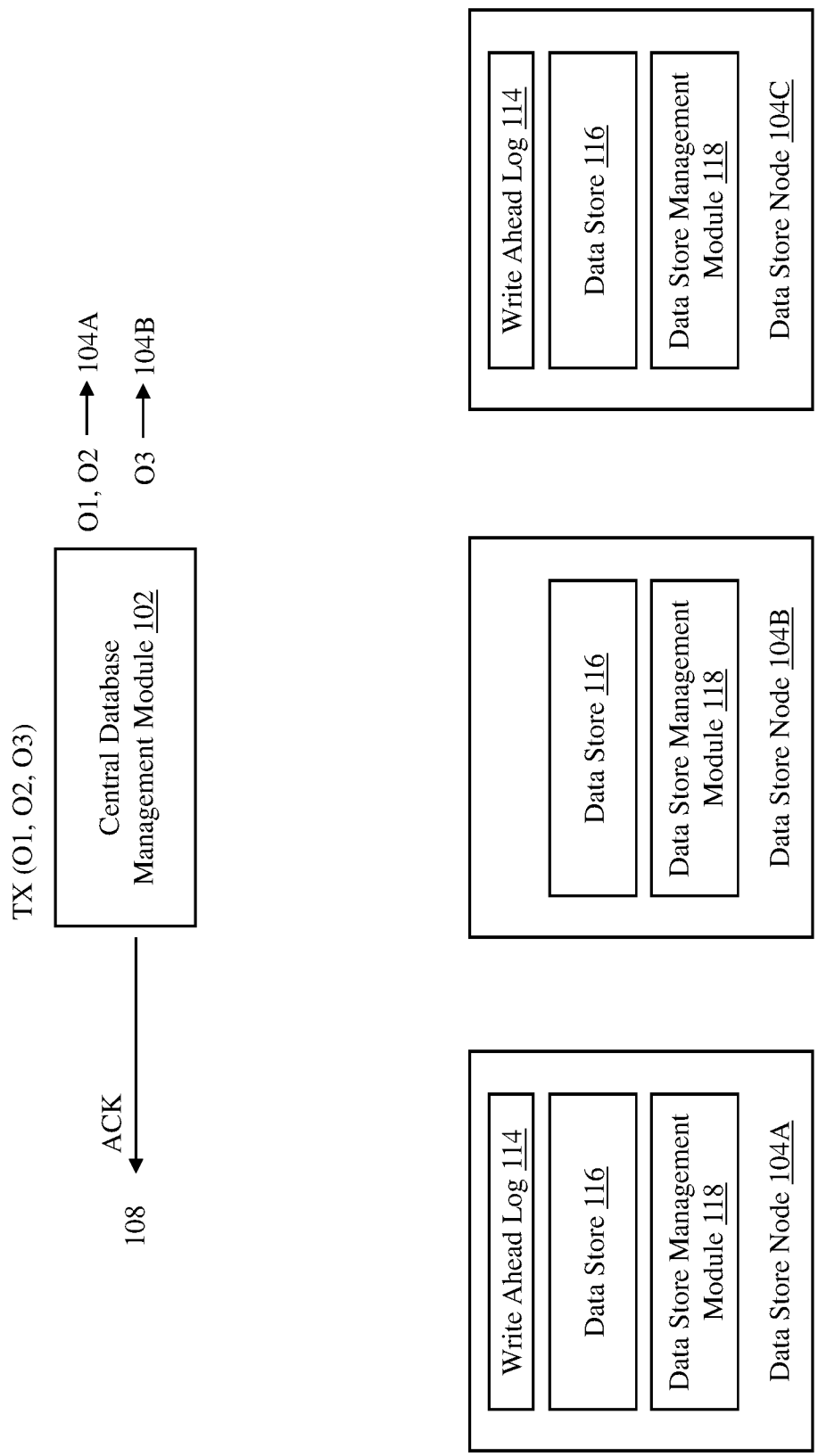

Next, at block 312, the central database management module 102 determines whether reply messages from all the data store nodes to which the prepare requests were sent have been received. If all the reply messages have not been received, at block 314, the central database management module reports an error, which may be presented to the requesting software process or to a user of the distributed data storage system 100. However, if all the reply messages have been received, the operation proceeds to block 316, where the central database management module sends an acknowledgement message to the requesting software process that the transaction request has been received. This step is illustrated in FIG. 4E, which shows an acknowledgement message being sent back to the software process from the central database management module.

Figure 4F:
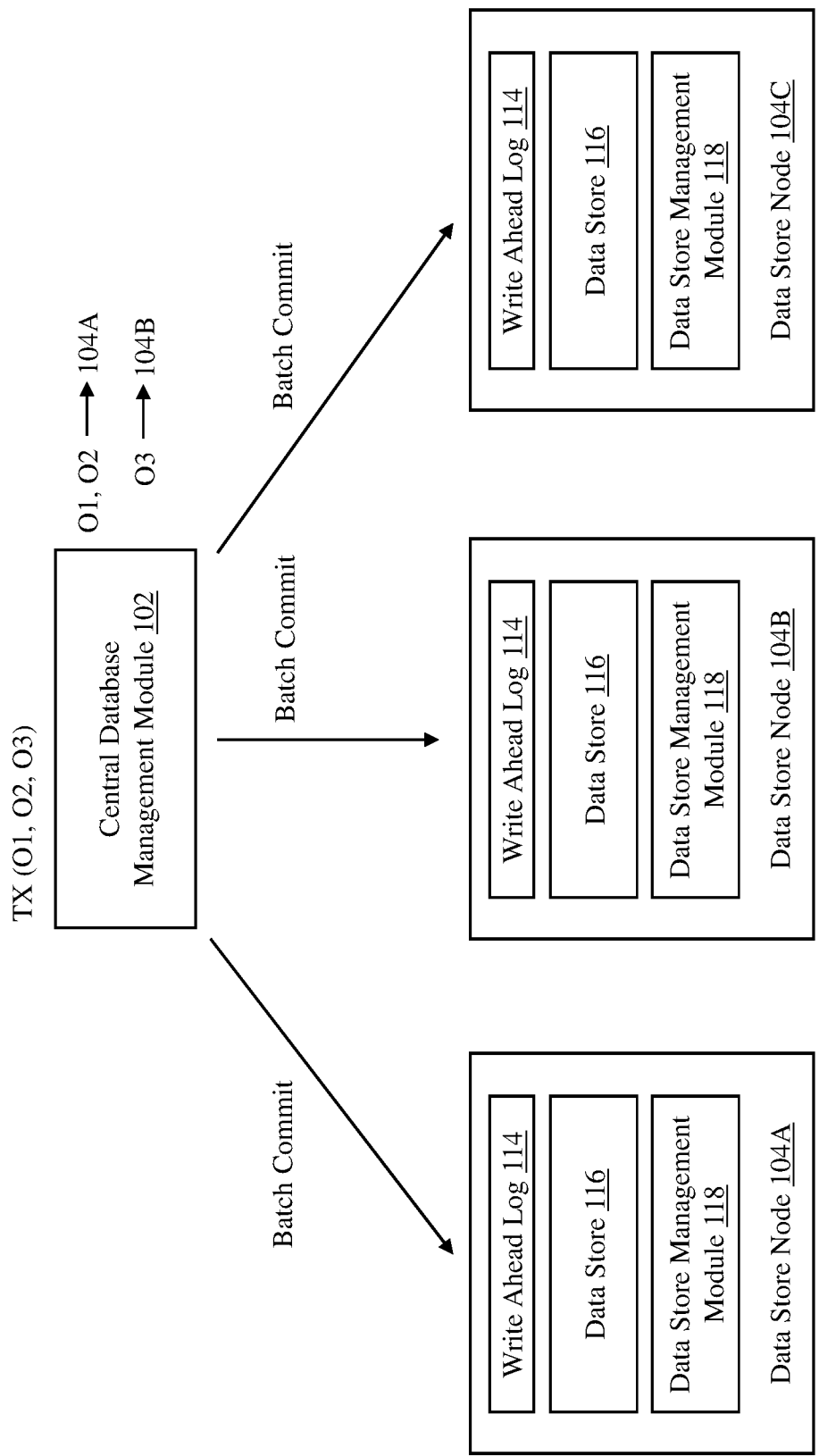

Next, at block 318, the central database management module 102 determines whether a batch commit request should be sent to all the data store nodes 104. In an embodiment, the central database management module initiates a batch commit process after a predetermined number of transaction requests has been processed or after a predetermined time period. If a batch commit process should not be initiated, the operation proceeds back to block 302, where another transaction request is received to be processed. However, if a batch commit process should be initiated, the operation proceeds to block 320, where a batch commit request with a maximum transaction ID (maxTransactionId) is sent to all the data store nodes. The batch commit requests instruct the data store nodes to commit all the prepare requests that have not yet been committed but have transaction IDs less than or equal to the maxTransactionId included in the batch commit requests. In response, each data store node commits all the operations in the previously received, uncommitted prepare requests which has transaction ID less than or equal to the maxTransactionId of the commit request. This step is illustrated in FIG. 4F, which shows the central database management module sending batch commit requests to the data store nodes 104A, 104B and 104C for the data store nodes to execute batch commit, which may involve recording entries in their respective write ahead logs that certain prepare requests have been committed. The operation then proceeds back to block 302, where another transaction request is received to be processed.

Figure 5A:
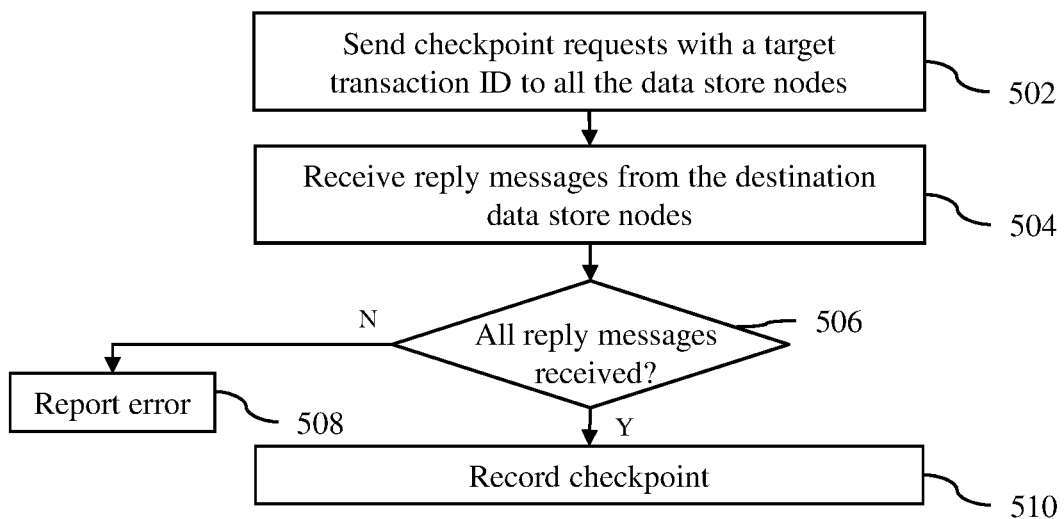
FIG. 5A is a process flow diagram of a checkpointing operation performed by the central database management module in accordance with an embodiment of the invention.

As transaction requests are processed, the central database management module 102 performs checkpointing operations at predefined time intervals or after certain number of transaction requests have been processed. A checkpointing operation performed by the central database management module 102 in accordance with an embodiment of the invention will now be described with reference to a flow diagram of FIG. 5A.

At block 502, the central database management module sends a checkpoint request with a target transaction ID to all the data store nodes. The target transaction ID identifies the most recent transaction request to which the checkpointing operation should be applied. That is, the target transaction ID indicates that all past operations for transaction requests up to and including the operations for the transaction request of the target transaction ID should be checkpointed.

Next, at block 504, the central database management module 102 receives reply messages from the data store nodes in response to the checkpoint request. The reply message from each data store node indicates that the checkpointing request has been successfully applied at that data store node.

Next, at block 506, the central database management module 102 makes a determination if reply messages have been received from all the data store nodes. If all the reply messages have not been received, the operation proceeds to block 508, where the central database management module reports an error to indicate that the checkpointing operation has failed. The error may be presented to the use of the distributed storage system 100. However, if all the reply messages have been received, the operation proceeds to optional block 510, where the central database management module records the checkpointing operation in a data structure, which may be stored in any storage accessible by the central database management module. The operation then comes to an end.

Figure 5B:
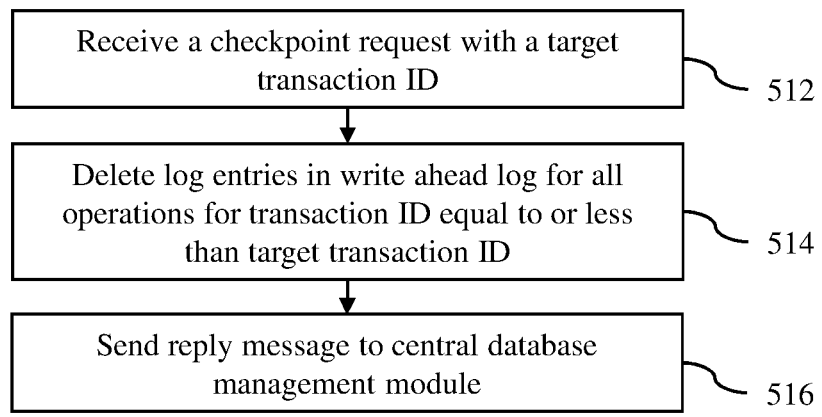
FIG. 5B is a process flow diagram of a checkpointing operation performed by each of the data store nodes in accordance with an embodiment of the invention.

The checkpointing operation performed by each of the data store nodes 104 in accordance with an embodiment of the invention will now be described with reference to a flow diagram of FIG. 5B. At block 512, the data store node receives a checkpoint request with a target transaction ID from the central database management module 102.

Next, at block 514, the data store management module 118 of the data store node 104 replays and then deletes log entries in the write ahead log 114 for all operations for transaction IDs equal to or less than the target transaction ID specified in the checkpoint request. As an example, if the write ahead log of the data store node includes entries for transaction IDs 0014, 0015 and 0017 and the target transaction ID is 0016, then the entries for transaction IDs 0014 and 0015 will be deleted since those are less than the target transaction ID 0016. However, the entries for transaction ID 0017 will not be replayed or deleted since transaction ID 0017 is not less than or equal to the target transaction ID 0016.

Next, at block 516, the data store management module 118 of the data store node 104, which has successfully deleted the appropriate log entries in the write ahead log 114, sends a checkpoint reply message to the central database management module 102. The operation then comes to an end.

Figure 6:
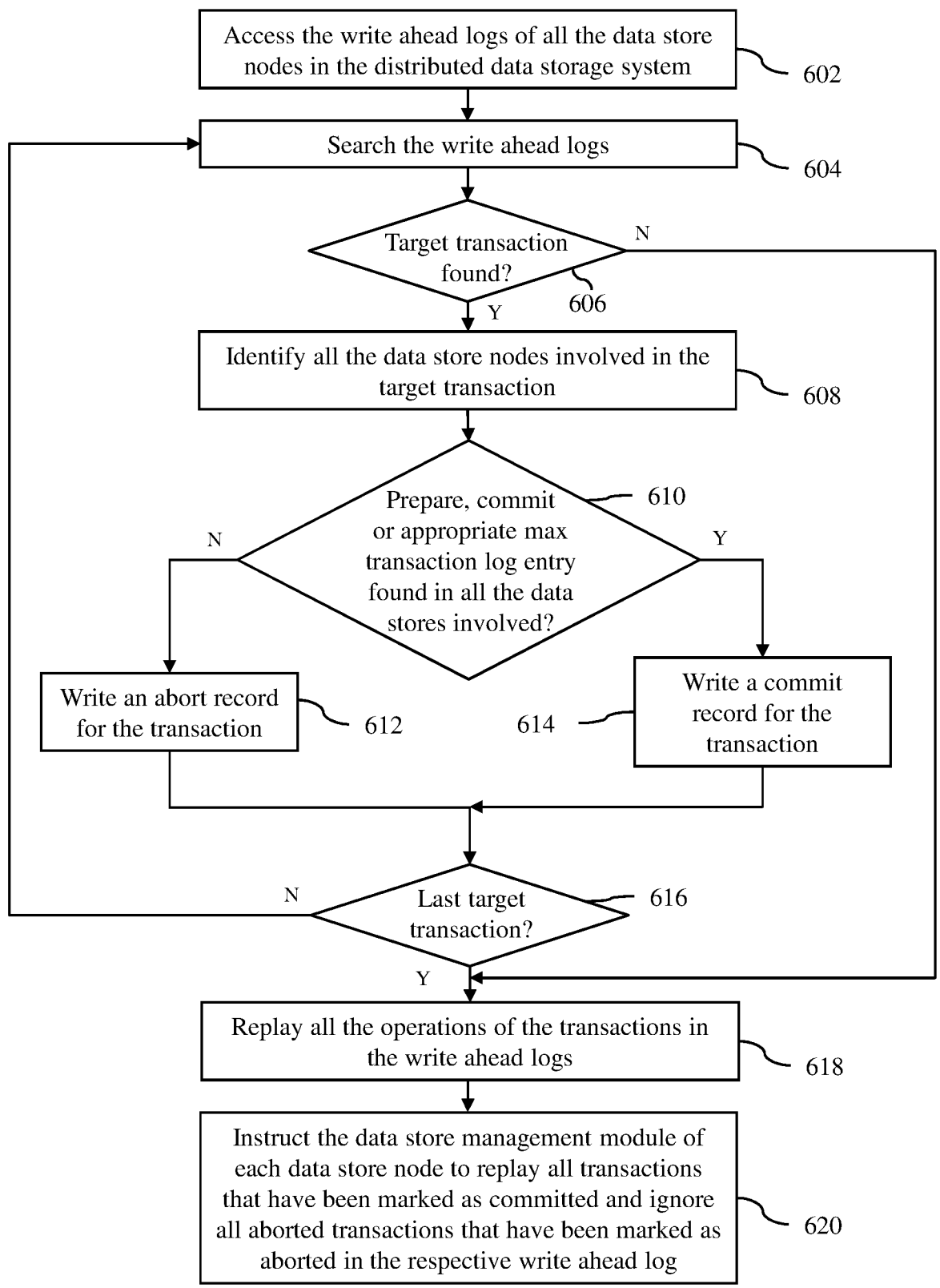
FIG. 6 is a process flow diagram of the recovery operation of the distributed data storage system in accordance with an embodiment of the invention.

The recovery operation of the distributed data storage system 100 in the event of a failure in accordance with an embodiment of the invention will now be described with reference to a flow diagram of FIG. 6. At block 602, after a failure event, the central database management module 102 accesses the write ahead logs 114 of all the data store nodes 104 in the distributed data storage system. In an embodiment, the central database management module accesses the write ahead logs of all the data store nodes by retrieving the write ahead logs from the data stores nodes and storing the retrieved write ahead logs in memory accessible by the central database management module. The write ahead logs may be retrieved using application programming interfaces or other known communication protocols to request the data store management module 118 of each data store node to transmit the respective write ahead log from that data store node to the central database management module.

Next, at block 604, the central database management module 102 searches through the write ahead logs 114 of all the data store nodes 104 in the distributed data storage system 100 to find a target transaction, which is a transaction that includes both a prepare log entry and a corresponding commit log entry in the write ahead log for one of the data store nodes.

Next, at block 606, the central database management module 102 determines whether a target transaction is found. If a target transaction is not found, the operation proceeds to block 616. However, if a committed transaction is found, the operation proceeds to block 608, where the central database management module identifies all the data store nodes involved in this target transaction. The list of data store nodes involved in the target transaction may be found in either the prepare log entry or the commit log entry for the transaction.

Next, at block 610, the central database management module 102 searches through the write ahead logs 114 of all the other data store nodes 104 involved in the transaction to determine if each of these data store nodes has either a prepare log entry, a commit log entry or an appropriate max transaction log entry that indicates every transaction with a transaction ID equal to or less than the transaction ID of the target transaction has been handled. Thus, the appropriate max transaction may indicate a transaction ID equal to or greater than the transaction ID of the target transaction. If no, then the operation proceeds to block 612, where the central database management module writes an abort record for the transaction in any data structure accessible by the central database management module. If yes, then the operation proceeds to block 614, where the central database management module writes a commit record for the transaction in the data structure. In either case, the operation then proceeds to block 616, where the central database management module determines whether the target transaction is the last target transaction in the write ahead logs of all the data store nodes.

If the current target transaction is not the last target transaction, the operation proceeds back to block 604 to search for another target transaction. If the current target transaction is the last target transaction, the operation proceeds to block 618.

At block 618, after all the committed transactions have been found and checked, the central database management module 102 replays all the operations of the transactions in the write ahead logs 114. For each transaction that was marked with a commit record, the transaction is committed and recorded as such. For each transaction that was marked with an abort record, the transaction is treated as aborted and any changes in the transaction will never be replayed onto the data store.

Next, at block 620, the central database management module 102 instructs the data store management module 118 of each data store node 104 to replay all transactions that have been marked as committed and ignore all aborted transactions that have been marked as aborted in the respective write ahead log 114.

Below is a pseudo-code of the recovery operation that may be performed by the distributed storage system 100 in accordance with one implementation.

```
--------------------------------------------------------
for (each log entry on each data store) {
  if (the log entry is prepare and has a corresponding commit record) {
    continue;
  }
  // check whether this prepare record is on all intended data stores
  txIsComplete = true;
  for (every data store in the list of sub-datastores in the log record) {
    if (the data stores' log entry has a commit record for this transaction) {
      continue;
    }
    if (the data stores' log entry said every tx <= this txId has been
    handled) {
      continue;
    }
    // the data store does not have the Prepare or Commit record for
    this transaction
    txIsComplete = false;
  }
  if (txIsComplete) {
    write a commit record of this Tx;
  } else {
    write an abort record of this Tx;
  }
}
// now we know whether each tx should be committed or aborted
// replay all logs by actually perform the transactions
for (each log entry on each data store) {
  if (is a commit) {
    commit this transaction;
  }
}
// mark the completion of transactions
for (each data store) {
  write a tx record with the max TxId handled on this log stating that
  everything before this tx Id has been handled;
}
--------------------------------------------------------
```

The use of prepare requests that include a list of data store nodes 104 involved in the transaction request in accordance with embodiments of the invention guarantees the correctness of the transaction semantic in all failure scenarios. In addition, the prepare requests allow the removal of a central log at the central database management module 102. Without the list in the prepare requests, recovery operations may not correctly identify which transaction should be aborted or committed without a central log at the central database management module. Let's take the example illustrated in FIGS. 4A-4F and assume that the list of data store nodes involved in the transaction was not included in the prepare requests to the data store nodes 104A and 104B. If the data store node 104B has a transient failure and did not write any record for this transaction, and then the whole system restarted while the central database management module is waiting for reply from the data store node 104B. After restart, there is no way to know whether the data store node 104B has lost the transaction record or whether the original transaction only intended to write to the data store node 104A.

Figure 7:
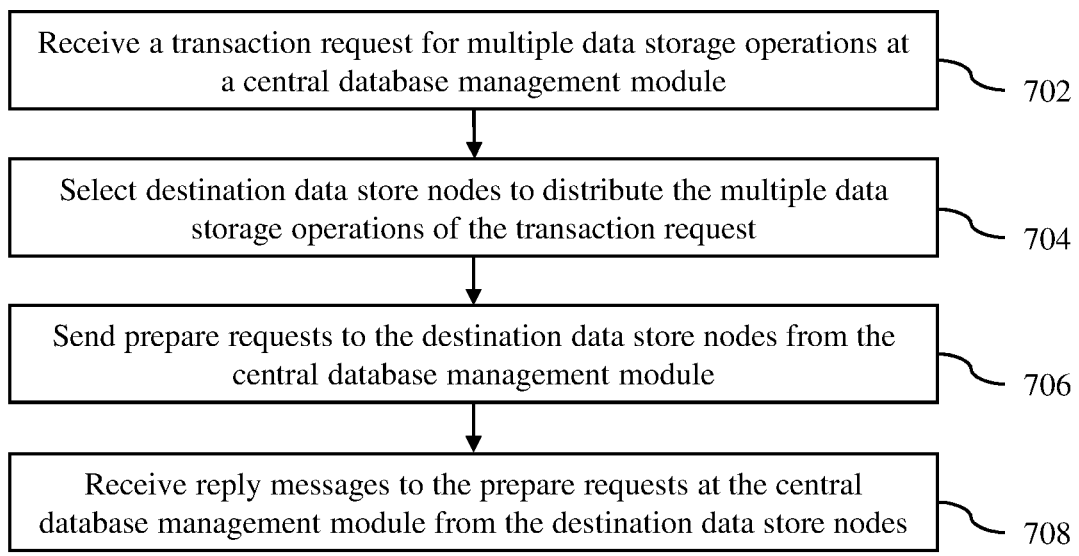
FIG. 7 is a flow diagram of a method for managing transaction requests in a distributed data storage system in accordance with an embodiment of the invention.

A method for managing transaction requests in a storage system with multiple data store nodes in accordance with an embodiment of the invention is described with reference to a flow diagram of FIG. 7. At block 702, a transaction request for multiple data storage operations is received at a central database management module of the data storage system. Next, at block 704, destination data store nodes of the data storage system are selected to distribute the multiple data storage operations of the transaction request. Next, at block 706, prepare requests are sent to the destination data store nodes from the central database management module. Each prepare request to a particular destination data store node includes at least one of the multiple data storage operations to be handled by the particular destination data store node and a list of the destination storage nodes involved in the transaction request. Next, at block 708, reply messages to the prepare requests are received at the central database management module from the destination data store nodes to confirm that the destination data store nodes will handle the multiple data storage operations of the transaction request.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing transaction requests in a data storage system with multiple data store nodes, the method comprising:
   receiving a transaction request for multiple data storage operations at a central database management module of the data storage system;
   selecting destination data store nodes of the data storage system to distribute the multiple data storage operations of the transaction request;
   sending prepare requests to the destination data store nodes from the central database management module, each prepare request to a particular destination data store node including at least one of the multiple data storage operations to be handled by the particular destination data store node and a list of the destination data store nodes involved in the transaction request;
   receiving reply messages to the prepare requests at the central database management module from the destination data store nodes to confirm that the destination data store nodes will handle the multiple data storage operations of the transaction request; and
   after a failure, executing a recovery operation using write ahead logs of the selected destination data store nodes to determine whether data storage operations indicated in the write ahead logs should be committed or aborted, including, for a particular transaction request, using a list of the selected destination data store nodes involved in the particular transaction request that is included in a corresponding prepare request to check whether data storage operations of the particular transaction request should be committed or aborted.

2. The method of claim 1, further comprising generating a unique transaction identification for the transaction request, wherein the unique transaction identification is included in the prepare requests.

3. The method of claim 1, further comprising transmitting a batch commit request to the selected destination data store nodes of the data storage system so that uncommitted prepare requests are committed by the selected destination data store nodes.

4. The method of claim 3, wherein the prepare and batch commit requests are recorded as entries in write ahead logs of the selected destination data store nodes.

5. The method of claim 4, further comprising transmitting a checkpointing request to the selected destination data store nodes of the data storage system, the checkpointing request including at least a target transaction identification so that entries in the write ahead logs of the selected destination data store nodes that are associated with a transaction request corresponding to the target transaction identification and earlier transaction requests are deleted.

6. The method of claim 1, wherein executing the recovery operation comprises:
   searching for a target transaction in a write ahead log of a particular selected destination data store node, wherein the target transaction includes a prepare request and a corresponding commit request in the write ahead log of the particular selected destination data store node;
   using a list of the selected destination data store nodes involved in the target transaction in one of the prepare and commit requests of the target transaction, searching the write ahead logs of the other selected destination data store nodes in the list of the selected destination data store nodes involved in the target transaction for corresponding prepare requests for the target transaction, corresponding commit entries for the target transaction or appropriate maximum transaction identifications that indicate transactions with transaction identifications equal to or less than the maximum transaction identifications have been handled; and
   writing either a commit record or an abort record for the transaction request depending on results of the searching of the write ahead logs of the selected destination data store nodes in the list of the selected destination data store nodes involved in the target transaction.

7. A non-transitory computer-readable storage medium containing program instructions for managing transaction requests in a data storage system, wherein execution of the program instructions by one or more processors of a computer system causes the one or more processors to perform steps comprising:
receiving a transaction request for multiple data storage operations at a central database management module of the data storage system;
selecting destination data store nodes of the data storage system to distribute the multiple data storage operations of the transaction request;
sending prepare requests to the destination data store nodes from the central database management module, each prepare request to a particular destination data store node including at least one of the multiple data storage operations to be handled by the particular destination data store node and a list of the destination data store nodes involved in the transaction request;
receiving reply messages to the prepare requests at the central database management module from the destination data store nodes to confirm that the destination data store nodes will handle the multiple data storage operations of the transaction request; and
after a failure, executing a recovery operation using write ahead logs of the selected destination data store nodes to determine whether data storage operations indicated in the write ahead logs should be committed or aborted, including, for a particular transaction request, using a list of the selected destination data store nodes involved in the particular transaction request that is included in a corresponding prepare request to check whether data storage operations of the particular transaction request should be committed or aborted.

8. The computer-readable storage medium of claim 7, wherein the steps further comprise generating a unique transaction identification for the transaction request, wherein the unique transaction identification is included in the prepare requests.

9. The computer-readable storage medium of claim 7, wherein the steps further comprise transmitting a batch commit request to the selected destination data store nodes of the data storage system so that uncommitted prepare requests are committed by the selected destination data store nodes.

10. The computer-readable storage medium of claim 9, wherein the prepare and batch commit requests are recorded as entries in write ahead logs of the selected destination data store nodes.

11. The computer-readable storage medium of claim 10, wherein the steps further comprise transmitting a checkpointing request to the selected destination data store nodes of the data storage system, the checkpointing request including at least a target transaction identification so that entries in the write ahead logs of the selected destination data store nodes that are associated with a transaction request corresponding to the target transaction identification and earlier transaction requests are deleted.

12. The computer-readable storage medium of claim 7, wherein executing the recovery operation comprises:
searching for a target transaction in a write ahead log of a particular selected destination data store node, wherein the target transaction includes a prepare request and a corresponding commit request in the write ahead log of the particular selected destination data store node;
using a list of the selected destination data store nodes involved in the target transaction in one of the prepare and commit requests of the target transaction, searching the write ahead logs of the other selected destination data store nodes in the list of the selected destination data store nodes involved in the target transaction for corresponding prepare requests for the target transaction, corresponding commit entries for the target transaction or appropriate maximum transaction identifications that indicate transactions with transaction identifications equal to or less than the maximum transaction identifications have been handled; and
writing either a commit record or an abort record for the transaction request depending on results of the searching of the write ahead logs of the selected destination data store nodes in the list of the selected destination data store nodes involved in the target transaction.

13. A data storage system comprising:
memory; and
a processor configured to:
receive a transaction request for multiple data storage operations at a central database management module;
select destination data store nodes to distribute the multiple data storage operations of the transaction request;
send prepare requests to the destination data store nodes from the central database management module, each prepare request to a particular destination data store node including at least one of the multiple data storage operations to be handled by the particular destination data store node and a list of the destination data store nodes involved in the transaction request;
receive reply messages to the prepare requests at the central database management module from the destination data store nodes to confirm that the destination data store nodes will handle the multiple data storage operations of the transaction request; and
after a failure, execute a recovery operation using write ahead logs of the selected destination data store nodes to determine whether data storage operations indicated in the write ahead logs should be committed or aborted, including, for a particular transaction request, using a list of the selected destination data store nodes involved in the particular transaction request that is included in a corresponding prepare request to check whether data storage operations of the particular transaction request should be committed or aborted.

14. The data storage system of claim 13, wherein the processor is configured to generate a unique transaction identification for the transaction request, wherein the unique transaction identification is included in the prepare requests.

15. The data storage system of claim 13, wherein the processor is configured to transmit a batch commit request to the selected destination data store nodes so that uncommitted prepare requests are committed by the selected destination data store nodes.

16. The data storage system of claim 15, wherein the prepare and batch commit requests are recorded as entries in write ahead logs of the selected destination data store nodes.

17. The data storage system of claim 15, wherein the processor is configured to transmit a checkpointing request to the selected destination data store nodes, the checkpointing request including at least a target transaction identification so that entries in the write ahead logs of the selected destination data store nodes that are associated with a transaction request corresponding to the target transaction identification and earlier transaction requests are deleted.

18. The data storage system of claim 13 wherein execution of the recovery operation comprises:
    searching for a target transaction in a write ahead log of a particular selected destination data store node, wherein the target transaction includes a prepare request and a corresponding commit request in the write ahead log of the particular selected destination data store node;
    using a list of the selected destination data store nodes involved in the target transaction in one of the prepare and commit requests of the target transaction, searching the write ahead logs of the other selected destination data store nodes in the list of the selected destination data store nodes involved in the target transaction for corresponding prepare requests for the target transaction, corresponding commit entries for the target transaction or appropriate maximum transaction identifications that indicate transactions with transaction identifications equal to or less than the maximum transaction identifications have been handled; and
    writing either a commit record or an abort record for the transaction request depending on results of the searching of the write ahead logs of the selected destination data store nodes in the list of the selected destination data store nodes involved in the target transaction.

* * * * *